(12) United States Patent
Ranganathan et al.

(10) Patent No.: US 11,985,115 B2
(45) Date of Patent: *May 14, 2024

(54) SECURE MEDIA STREAMING COMMUNICATION VIA USER DATAGRAM PROTOCOL

(71) Applicant: DISH Network Technologies India Private Limited, Karnataka (IN)

(72) Inventors: Gopikumar Ranganathan, Bangaluru (IN); Rakesh Eluvan Periyaeluvan, Bangalore (IN)

(73) Assignee: DISH Network Technologies India Private Limited (IN)

( * ) Notice: Subject to any disclaimer, the term of this patent is extended or adjusted under 35 U.S.C. 154(b) by 0 days.

This patent is subject to a terminal disclaimer.

(21) Appl. No.: 18/179,984

(22) Filed: Mar. 7, 2023

(65) Prior Publication Data

US 2023/0224287 A1 Jul. 13, 2023

Related U.S. Application Data

(63) Continuation of application No. 17/444,882, filed on Aug. 11, 2021, now Pat. No. 11,611,542.

(51) Int. Cl.
*H04L 9/40* (2022.01)
*H04L 65/1045* (2022.01)
*H04L 67/02* (2022.01)

(52) U.S. Cl.
CPC ........ *H04L 63/0485* (2013.01); *H04L 63/166* (2013.01); *H04L 65/1045* (2022.05); *H04L 67/02* (2013.01)

(58) Field of Classification Search
CPC .............. H04L 63/0485; H04L 63/166; H04L 65/1045; H04L 67/02
USPC ......................................................... 713/153
See application file for complete search history.

(56) References Cited

U.S. PATENT DOCUMENTS

| | | | |
|---|---|---|---|
| 7,795,062 B2 | 9/2010 | Taussig et al. | |
| 8,060,645 B1 * | 11/2011 | Catania | H04L 1/1838 709/224 |
| 8,149,851 B2 | 4/2012 | Asnis et al. | |
| 8,626,879 B2 | 1/2014 | Dham et al. | |
| 8,750,112 B2 | 6/2014 | Bajpai et al. | |
| 8,799,485 B2 | 8/2014 | Rao et al. | |
| 9,049,144 B2 | 6/2015 | Bajpai et al. | |
| 9,432,245 B1 * | 8/2016 | Sorenson, III | H04L 47/125 |

(Continued)

*Primary Examiner* — Michael S McNally
(74) *Attorney, Agent, or Firm* — KW Law, LLP

(57) ABSTRACT

Automated processes, computing systems, computing devices and other aspects of a data processing system provide improved reliability in delivering digital media content over the Internet or a similar wide area network without sacrificing data security. Content is initially placed into a secure format (e.g., secure hypertext transport protocol (HTTPS) via transport control protocol (TCP) or the like). Prior to transmission on the network, the secure data packets are encapsulated within connectionless frames, such as user datagram protocol (UDP) frames. The client device that receives the encapsulated packets extracts the underlying secure content from the connectionless frames for further processing. The encapsulation into connectionless data frames permits client and server devices to establish effective streaming sessions while preserving the security of the underlying data.

20 Claims, 2 Drawing Sheets

(56) References Cited

U.S. PATENT DOCUMENTS

Figure 1:
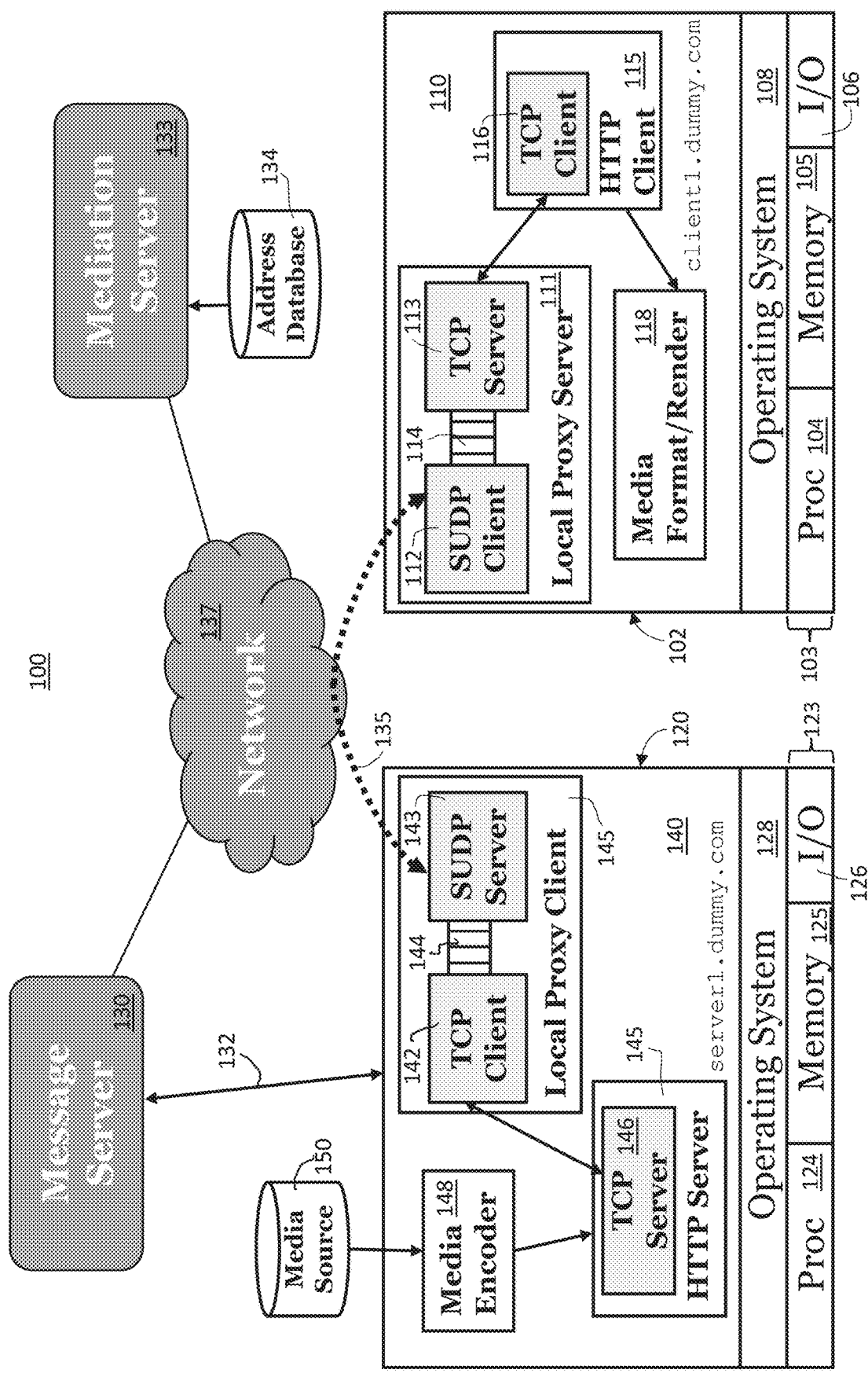

| | | | |
|---|---|---|---|
| 2005/0071491 A1* | 3/2005 | Seo | H04N 21/658 |
| | | | 348/E7.071 |
| 2006/0248216 A1* | 11/2006 | Park | H04L 65/1101 |
| | | | 709/231 |
| 2010/0303053 A1* | 12/2010 | Akbari | H04L 1/1685 |
| | | | 370/345 |
| 2011/0164558 A1* | 7/2011 | Chee | H04W 28/06 |
| | | | 370/328 |
| 2011/0196521 A1 | 8/2011 | Jain et al. | |
| 2011/0219113 A1* | 9/2011 | Grewal | G06F 15/16 |
| | | | 709/224 |
| 2014/0068081 A1* | 3/2014 | Sazawa | H04L 47/70 |
| | | | 709/226 |
| 2016/0094467 A1* | 3/2016 | Hong | H04L 47/2441 |
| | | | 370/235 |
| 2020/0213273 A1 | 7/2020 | Periyaeluvan et al. | |
| 2020/0389510 A1 | 12/2020 | Major et al. | |

* cited by examiner

SECURE MEDIA STREAMING COMMUNICATION VIA USER DATAGRAM PROTOCOL

PRIORITY CLAIM

This application is a continuation of U.S. patent application Ser. No. 17/444,882 filed on Aug. 11, 2021, now U.S. Pat. No. 11,611,542.

TECHNICAL FIELD

The following discussion generally relates to secure data connections between client and server devices over a wide area network. Various embodiments may be used in connection with media players, placeshifting devices, digital video recorder (DVR) devices, video game players and/or any other devices that receive streaming media or other digital content via the Internet or a similar network.

BACKGROUND

In the past, television viewing typically occurred at home, with one or more family members gathered in front of a television to watch a broadcast program. While conventional television viewing continues to be a popular activity, media streaming is becoming increasingly commonplace. Many viewers now watch their television and other media content as media streams delivered to phones, tablets, portable computers or other mobile devices. Other devices such as video game players, digital video recorders, television receivers, set top boxes and other media devices are becoming increasingly capable of handling streaming media content, and these have been well-received by viewers.

As viewers enjoy their content on a variety of playback devices, it can be a continual challenge to locate and establish reliable streaming connections with all of these different devices over a wide variety of networks. Home networks configured by non-professional users can present particular challenges due to complexity and the wide variety of networking equipment and different configurations that are encountered. Most current media streaming schemes rely upon encryption and transport protocols that can be cumbersome to implement, especially for home-type users, without compromising the security of the data and/or the home network.

It is therefore desirable to create devices, systems and automated processes to deliver secure streaming media content to client devices operating on the Internet or other wide area networks. It is particularly desirable to effectively establish secure media streaming connections that do not rely upon complicated router configurations or the like. Moreover, it is desirable to maintain the security and integrity of the connection and its transmitted data. Other desirable features and characteristics will become apparent from the subsequent detailed description and the appended claims, taken in conjunction with the accompanying drawings and this background section.

BRIEF DESCRIPTION

Various embodiments relate to different automated processes, computing systems, devices and other aspects of a data processing system that provides secure delivery of media content using standard protocols, such as HTTPS/TCP that is encapsulated within secure UDP or the like prior to transmission. In various embodiments, originating packets in a secure format (e.g., HTTPS via TCP or the like) are encapsulated as data within secure UDP frames prior to transmission on the network. A media server, for example, uses a proxy client to encapsulate HTTPS data into secure UDP frames. The encapsulated packets are then transmitted to the player device, which appropriately receives the secure UDP packets and extracts the original secure HTTP content. The extracted data is then delivered to the media client via a proxy TCP server executing on the client device. Encapsulating secure TCP content within a secure form of UDP is contrary to traditional network concepts because it removes the connection-based reliability of TCP. Nevertheless, the secure UDP encapsulation permits the client and server devices to establish effective streaming sessions while preserving the security of the underlying data. Moreover, because the communications can be made via relatively standard communications protocols, the need for customized router configuration or the like is reduced in comparison to proprietary solutions.

Some embodiments provide an automated process performed by a DVR, placeshifter, media server or other server device to securely provide requested content to a client device via a wide area network. The automated process may be implemented using software or firmware that is stored in a memory or other non-transitory storage for execution by one or more processors of the server device. The automated process suitably comprises: receiving, via the wide area network, a request message from the client device that identifies the requested content, wherein the request message is formatted in a connectionless but secure user datagram protocol (UDP) format that encapsulates secure data formatted in a connection-based transmission control protocol (TCP) format; processing the request message to thereby extract the secure data formatted in the connection-based TCP format from the connectionless format; authenticating the extracted secure data formatted in the connection-based TCP format by the TCP service; and if the authenticating is successful: obtaining the requested content; formatting the requested content according to the connection-based TCP format; encapsulating the requested content that is formatted according to the connection-based TCP format into data packets formatted according to the connectionless protocol; and transmitting the encapsulated data packets formatted according to the connectionless protocol to the client device via the wide area network.

Other embodiments could relate to systems for establishing and continuing communications through secure connectionless constructs that encapsulate secure media content. Still other embodiments could relate to server and/or client devices that are configured to communicate using secure connectionless constructs that encapsulate secure media content. Other devices, systems and automated processes may be formulated in additional to those described in this brief summary section.

DRAWING FIGURES

FIG. 1 illustrates an example of a system 100 to securely deliver streaming media content from a server device 120 to a client device 102 via a wide area network 137.

Figure 2:
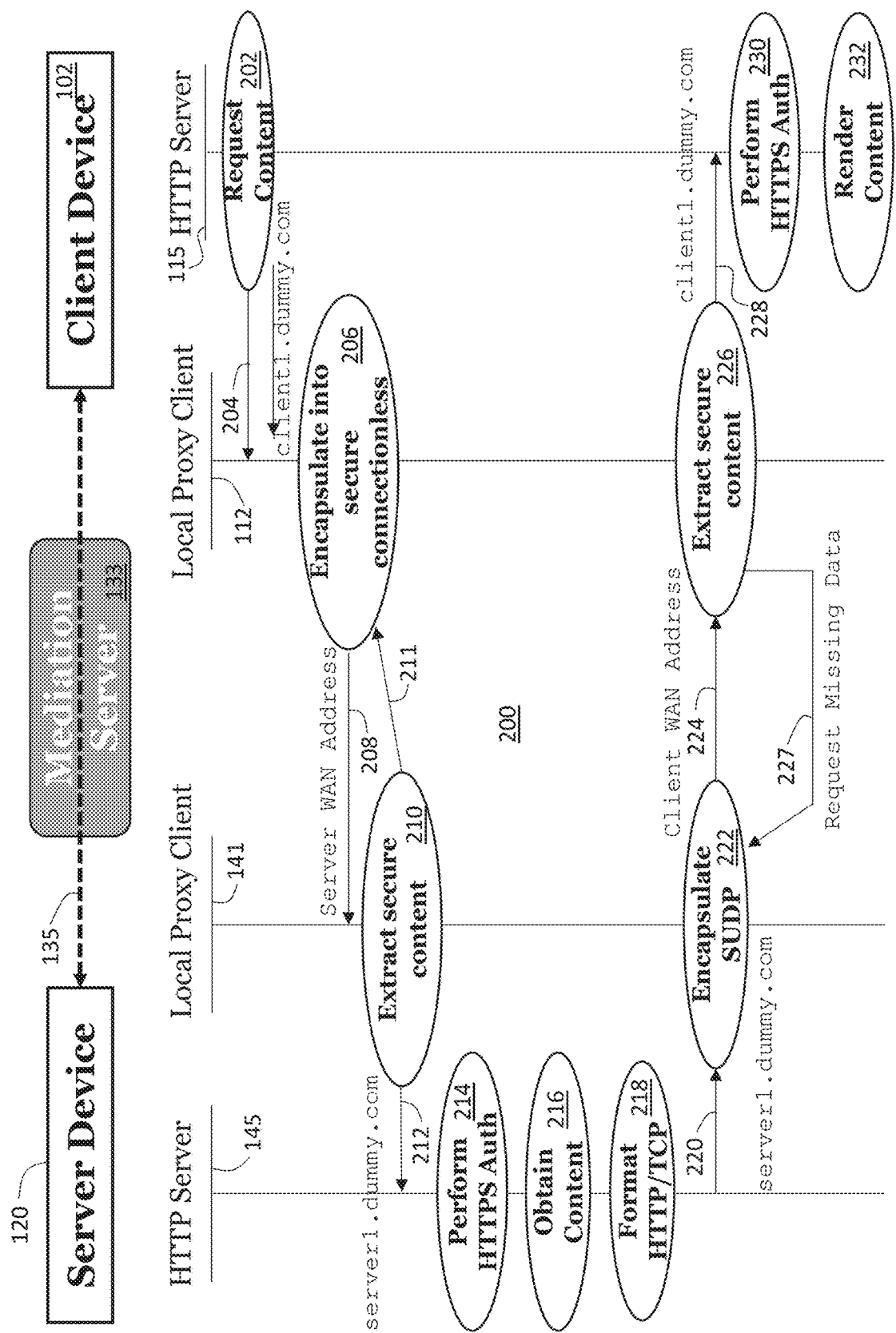

FIG. 2 is a diagram showing various example processes 200 to securely deliver streaming media content from a server device 120 to a client device 102 via a wide area network 137.

DETAILED DESCRIPTION

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

Various embodiments encapsulate secure transmission control protocol (TCP) packets (e.g., hypertext transport protocol (HTTP) packets) carrying encoded digital media content within secure user datagram protocol (UDP) or similar connectionless constructs. This allows for effective delivery on the network using secure connectionless structures while maintaining the security and reliability of underlying connection-based (e.g., TCP/HTTP) structures.

Frequently, connectionless data structures are used to establish communications between client and server devices. The well-known UDP protocol, for example, provides a connectionless transport layer protocol that is fast and efficient but that lacks sophisticated reliability mechanisms found in "connection-based" transport layer protocols. In particular, UDP supports "hole punching" that can permit communications between devices even when firewalls or the like obscure network addresses or otherwise block incoming packets. UDP is also a relatively streamlined protocol that is able to quickly establish connections, albeit without the end-to-end reliability of transmission control protocol (TCP) or the like. UDP is therefore particularly well suited for establishing network connections with consumer-type devices that are located behind firewalls or that are otherwise located on less sophisticated networks, such as devices located within a home or small office.

Conventional UDP, however, lacks the security capabilities typically implemented within connection-based transport layer protocols such as TCP. Several attempts have been made to enhance UDP for better reliability, and for better connectivity across unknown networks. U.S. Pat. No. 9,049,144 describes one example of a technique that transmits a device's internet protocol (IP) port numbers within enhanced UDP headers for better connectivity and security. As described therein, additional header data can be provided within a UDP or similar transport layer frame for better reliability. This additional data can provide a type of flow control that allows missed packets to be identified and re-sent. Such techniques are often referred to as "secure UDP" or "SUDP". U.S. Pat. No. 8,750,112 provides another example of a connectionless transport layer protocol with enhanced security and reliability. U.S. Pat. No. 8,149,851 describes another example technique (often referred to as "SNATT") for establishing network connections through an intermediary system. These documents are incorporated by reference herein as examples of secure connectionless/UDP techniques, although other embodiments could use different "secure UDP" implementations and/or features as desired.

With modern video streaming, many content owners now require that content be encrypted and/or protected with some type of digital rights management (DRM) prior to transmission. Often, these security mechanisms specify the use of secure hypertext transport protocol (HTTPS) structures or the like to ensure secure end-to-end encryption between the client and server devices. HTTPS protocols, though, typically rely upon reliable underlying transport layer connections, such as those established with TCP communications. HTTPS therefore provides effective security via a reliable data connection, but it does not typically function in a more flexible connectionless environment often used for media streaming.

By encapsulating HTTPS data into secure connectionless (e.g., UDP) packets, then, devices are better able to connect over unknown networks without sacrificing the security of the communications. Various embodiments may implement this general concept in any number of different ways.

In the embodiment illustrated in FIG. 1, a client device 102 contacts a server device 120 to establish a connection 135 via network 137. The server device 120 may provide media streams to the client 102, such as time and/or place shifted video, video on demand, other digital media content and/or the like. In the illustrated example, client-side logic 115 executed by client device 102 suitably formats HTTPS or similar requests for content. Rather than transmitting the formatted requests directly on the network 137, however, the client device 102 provides the TCP-formatted content to a proxy server 111 that operates on the same device 102 as the TCP client 116. In various embodiments, the TCP client 116 and proxy server 111 exchange messages using a "dummy" address (e.g., "client1.dummy.com" in the example of FIG. 1) that may not be directly routable on network 137. The proxy server 111 receives the TCP-formatted requests and encapsulates the packets within a secure UDP-type transport layer for transmission to server device 120 via network 137. The connectionless packets may use conventional IP addresses or the like that identify client device 102 and server device 120 on network 137, as appropriate.

The server device 120 suitably receives the encapsulated request via network 137. A proxy client 141 executed by the server device 120 suitably extracts the previously-encapsulated TCP/HTTPS content from the secure UDP-type packets, re-assembles the TCP/HTTPS content as needed, and provides the extracted content to the HTTP server 145 for authentication, authorization, decryption and/or other processing as needed.

In various embodiments, server device 120 formats the video content to be delivered in secure hypertext transport protocol (HTTPS) structures that are designed for delivery via reliable, connection-based transport connection protocols (TCP). An HTTPS server 145 operating at the server device 120 suitably formats content for connection-based delivery and then supplies the formatted content to a proxy client 126 operated by server device 120 that encapsulates the TCP content for delivery over network 137 via UDP or the like. The client device 102, conversely, requests and receives secure content via network 137 at a proxy TCP server that delivers content to an HTTP client 115, as appropriate.

FIG. 1 shows an example of a system 100 in which a client device 102 obtains streaming content from a server 120 via a wide area network 137. With reference to FIG. 1, the server device 120 includes a proxy client 141 that receives secure content from a TCP server 145 and embeds the secure content into connectionless transport layer structures for transmission across network 137. The secure UDP-like structures may appear as UDP packets to network routers and the like but can be modified to include additional data representing additional port numbers and/or packet tracking information, as described above.

As noted above, addressing used for HTTPS communications can be abstracted by using a separate URL or other address for the embedded secure data. The TCP server 146 in server device 120 and the TCP client 116 in client device 102 may use a separate domain name (e.g., "dummy.com", "commondomain.com", "dishboxes.com", etc.) for intra-application communications, if desired. Various embodiments could further use local addresses as sub-domains, e.g., in the form of "local-ip.commondomain.com" or the like, for further convenience. The shared domain can be registered with a network information center or the like for cryptographic key management and verification, if desired. Intra-device communications between TCP server 146 and TCP client 142 in server device 120, then, will typically use a different address than communications between client device 102 and server device 120. Similarly, TCP client 116 and TCP server 113 in client device 102 will generally use separate addresses, as appropriate. In some implementations, the "dummy" or proxy addresses can be used to abstract the UDP-type encapsulation from the TCP client 116 and TCP server 146. That is, these modules may simply communicate with each other using the "proxy" addresses without regard to the actual IP or other network addresses used on network 137, if desired.

Network 137 is any wide area network (WAN) such as the Internet, a telephony network, a public or private network of any sort, or the like. Network 137 may be based upon TCP/IP protocols, or any other protocols as desired, including any protocols subsequently developed. Equivalent embodiments may provide device location and/or streaming via local area networks, as appropriate.

Server device 120 is any sort of network device having conventional hardware 123 such as a processor 124, memory 126 and input/output interfaces 127 (e.g., a network interface), and any operating system 128 to support a media server application 140 having various processing routes and modules. In the example illustrated in FIG. 1, server device 120 suitably executes a media server application 140 that includes at least two portions corresponding to an HTTPS server 145 and a proxy client 141, as described herein. Server application 140 may also include processing 148 for retrieving and/or encoding video segments, as well as routines for key management, user/client authentication and the like. In many implementations, server application 140 obtains media content from a storage device 150 formatted to include a database of media content, although other embodiments may operate in any other manner or receive content from any other source. In the example illustrated in FIG. 1, the various functions and modules of server application 140 are implemented using software or firmware logic that is stored in memory 125 for execution by processor 124, although other embodiments could use equivalent computing hardware to perform the various functions, as desired.

Examples of different types of server devices 120 could include any streaming media source such as a file server or content delivery network (CDN), a video game device, a time and/or placeshifting device, and/or the like. In some implementations, server device 120 is a home-type server such as a local storage digital video recorder (LSDVR), placeshifting device and/or other media server device. One example of a server device 120 used in some implementations could be the AirTV Classic device that is available from http://www.airtv.net, although equivalent embodiments could be used with any number of other DVRs, media receivers/players, video on demand (VOD) servers, set top boxes, video game consoles, time or place shifting devices and/or the like. U.S. Pat. No. 7,795,062 provides additional detail about several example place shifting devices and techniques. Equivalent concepts could be implemented in any number of other devices or systems.

Media server application 140 may be designed and implemented in any manner. In the example shown in FIG. 1, server application 140 suitably includes a media encoder 148, an HTTP server 145 and a local proxy client 141 as described herein.

In various embodiments, the media encoder 148 obtains content from a database or other content source 150, as desired. Content may formatted into adaptive streaming segments, if desired, such as those described in U.S. Patent Publication No. 2020/0389510 or the like, although other embodiments may use different encoding and delivery schemes, as desired.

As shown in FIG. 1, HTTP server 145 provides authentication, authorization and encryption/decryption in accordance with HTTP/HTTPS protocols. FIG. 1 also shows a TCP server 146. In practice, higher level HTTP/HTTPS content can be encapsulated within TCP frames for transmission over an internet protocol (IP) network such as the internet. In this example, however, TCP packets are provided within media server application 140 to a TCP client 142 operating as part of local proxy client 141. The TCP client 142 handles interactions with the TCP/HTTP server 145, thereby abstracting network 137 from the server 145. As noted above, received TCP packets are appropriately encapsulated within connectionless UDP-type transport layer frames by the UDP server 143. In the example of FIG. 1, UDP server 143 is indicated as a "SUDP" server for "secure UDP", "Sling UDP", "specialized UDP", "supplemented UDP" or the like. In various embodiments, TCP packets received by TCP client 142 are stored in a buffer 144 or the like until they can be processed by UDP server 143. Buffer 144 may make use of memory 125 and/or any other data storage available to server device 120, as appropriate. Buffer 144 may also store packets moving in the opposite direction. That is, connectionless packets received via network 137 may be stripped of their UDP-type encapsulation and stored in buffer 144 prior to forwarding by TCP client 142, as desired.

Client device 102 is any device capable of communicating on network 137 to obtain data or services from server 120. In various embodiments, client device 102 is a mobile phone, tablet, computer and/or the like that interfaces with network 137 via hardware (e.g., processors, memory, input interfaces and the like) and any operating system 104 capable of supporting a client application 105. Client application 105 typically includes at least two portions corresponding to a proxy server 111 and an HTTPS client 115, as described herein. Client application 110 may further include additional logic 118 for media decoding, sequencing, rendering and/or the like. In various embodiments, client application 110 and its various components are implemented using software or firmware logic that is stored in memory 105 for execution by processor 104. Equivalent embodiments could use other computing structures and systems to implement similar features, as desired.

As described above, proxy server 111 suitably includes an SUDP client 112 that receives connectionless packets from server 120 via network 137 and a TCP server 113 that serves de-encapsulated TCP/HTTP packets to HTTP client 115. Proxy server 111 may also include a buffer 114 that allows for temporary storage of packets exchanged between UDP client 112 and TCP server 113. Buffer 114 may use memory 105 or other data storage available to client device 102, as desired.

HTTP client 115 performs HTTP/HTTPS encoding, including processing of digital certificates, encryption and the like. As noted above with regard to HTTP server 145, HTTP constructs may be transported using a TCP stack 116 prior to encapsulation within connectionless UDP-type frames, as desired. In some implementations, the local addressing used between HTTP client 115 and HTTP server 145 could be compatible such that the UDP encapsulation and transmission on network 137 are transparent to the client 115 and server 145, as desired. Again, various embodiments could use any equivalent protocols, as desired.

In practice, initial contact between client device 102 and server device 120 may be established in any manner. The system 100 illustrated in FIG. 1 shows a message service 130 and a mediation server 133 operating on network 137. Both services 130 and 133 are computer servers implemented with conventional hardware (e.g., one or more processors, memory, input/output interfaces and the like).

In many network environments, home-type routers and the like can block incoming connections that are not recognized. To improve connectivity in some implementations, server device 120 appropriately establishes a persistent connection 132 with message server 130 prior to receiving client requests. In this example, server device 120 places an outgoing request to the message server 130 via network 137. Requests for persistent connections 132 may be triggered by startup of server 120 (e.g., by firmware executing in server 120), if desired. Since the request is an outgoing request, it will typically be allowed by the home router, and any replies from message server 130 will typically also be allowed, since they are replies to request that initiated from the internal network. These communications can be used to establish a persistent connection 132 between server device 120 and message serve 130 that can be kept alive (e.g., using TCP "keepalive" packets) until the connection 132 is needed.

After persistent connection 132 is established, client devices 102 can use the messaging service 130 to forward requests new connections from particular servers 120 that are in communication with the desired server 120. Often, clients 102 are "hard coded" or otherwise provided with a preexisting address (e.g., a URL or other identity) of message service 130 on the WAN that can relay a message to the desired server 120 via a previously-established connection 132 between the message service 130 and the server 120. This allows the server 120 to make an outgoing connection to network 137, if indeed the server 120 can locate and communicate with the client device 102 that is requesting the connection.

Often, however, the server 120 is unable to contact the client device 102 due to network address translation issues relating to the client address, due to client-side firewalls blocking direct connections to the client 102, and/or due to other issues. Network-based relay services (e.g., mediation service 133) can be used to relay address information between the client device 102 and the server device 120 as desired. In various embodiments, mediation service 133 maintains a database 134 of addresses associated with various clients 102 and servers 120 so that when a connection is requested, the requesting party can obtain the relevant address of the other device. Alternately, devices 102 requesting connections could provide their then-current address information to the mediation service 133 when they transmit connection requests, as desired. To that end, many client devices 102 and server devices 120 can be configured (e.g., in firmware) to contact mediation server 133 whenever their address information changes or whenever a new connection is requested, as desired. One example of a mediation service 133 is described in US Patent Publication No. 2020/0213273, which is incorporated herein by reference as one example of a mediation service, although equivalent embodiments could use different systems, servers and techniques as appropriate.

In various embodiments, then, each server device 120 suitably registers its address information on network 137 with mediation service 133 and establishes a persistent connection with message service 130. Client device 102 similarly registers its address information with mediation service 133. When client device 102 wishes to connect to a particular server device 120, the client device 102 suitably contacts message server 130 to request a connection. Message server 130 then transmits the connection request to the server device via the previously-established persistent connection 132. Server device 120 is then able to retrieve the address information associated with the requesting client device 102 from mediation server 133. Equivalently, the message service 130 could obtain the information about client device 102 on behalf of the server 120, and this information could be forwarded to the server device 120 via connection 132 or the like.

When the server 120 has obtained the address information relating to the client, the server 120 suitably establishes outgoing connections to the relevant address in an attempt to connect to client device 102. In various embodiments, the server 120 attempts to BIND or otherwise connect to a known port on the destination address that is associated with a particular application. In other embodiments, server 120 uses network address translation (NAT) or similar techniques to attempt to contact the client 102, as desired. Several examples network mediation services and techniques are described in U.S. Pat. Nos. 8,149,851; 8,626,879; and 8,799,485, and in US Patent Publication No. 2011/0196521, all of which are incorporated herein by reference as examples. Equivalent embodiments could swap the roles of the "client" and "server" used in the preceding paragraph so that the "client" 102 (e.g., TCP server 113) drives the NAT or other hole punching process in an attempt to contact server device 120. In still other embodiments, mediation server 133 can provide address information to both client device 102 and server device 120 so that both devices can attempt to initiate connections with the other, thereby increasing the likelihood of success. Other embodiments could use other mediation or initial contact techniques, as desired.

After a connectionless UDP-type session 135 is established between the client device 102 and server device 120, then transactional data relating to media streaming or other functions can be exchanged. As noted above, it may be desirable to encapsulate secure HTTP or other TCP content within connectionless UDP-type packets for better transmission on network 137.

FIG. 2 shows an example process 200 for securely transmitting media content formatted within TCP constructs within a UDP-type connection 137. The various functions described in FIG. 2 are typically performed by programmed logic (e.g., software or firmware) stored within memory 105 or 125 and executed by processors 104 or 124, as appropriate. Other embodiments may perform additional functions, and/or may organize the different functions in an equivalent but alternate manner.

Client device 102 and server device 120 establish a connectionless transport-layer session 135 in any manner. As noted above, various embodiments allow client device 102 to initiate contact with server device 120 by using a messaging service 130 that has previously established a persistent TCP or similar connection 132 with the desired server device 120. The messaging service 130 is able to provide an instruction to the server device 120 via the pre-established connection 132 that directs the server device 120 to begin communications with the client device 102.

In various embodiments, the server device 120 responds to the instruction received on its persistent connection 132 by contacting mediation server 133. As noted above, mediation server 133 is programmed to facilitate a mediation connection between client device 102 and server device 120 using "SNATT" or similar mediation techniques. Mediation server 133 may also maintain an address database 134 of then-current addresses that are associated with client devices 102 and server device 120 to further assist in NAT-type "hole punching" directed toward the stored addresses. Such hole punching may be directed at the client device 102 and/or the server device 120, as desired. Many embodiments will attempt hole punching toward both devices 102 and 120 to increase the likelihood that at least one connection 135 can be established. Examples of mediated connection techniques are described in U.S. Pat. No. 8,149,851 and in US Patent Publications Nos. 2011/0196521 and 2020/0213273 (previously incorporated by reference), although other embodiments may modify these systems and techniques and/or may use different techniques as desired.

After connection 135 is established between client device 102 and server device 120, client device 102 suitably requests digital content (function 202) for presentation to the viewer. In embodiments based upon adaptive streaming techniques, the particular media segments of a requested stream may be selected by a media player application 110 based upon a digest of the media stream or the like. Typically, media segments are identified based upon a URL or similar address that is identified in the digest file associated with the media stream. The media player application 110 typically requests a particular media file for playback by transmitting a secure HTTP request for the URL associated with that file. In the embodiment illustrated in FIG. 2, HTTP client 115 suitably formats a secure HTTP request 204 that is forwarded to a proxy address (e.g., "client1.dummy.com") associated with the TCP server 112 executing on the same client device 102.

Request 204 may be sent to a particular port number (e.g., port 7000) that is associated with the local proxy server 112, as desired. Request 204 is therefore a formatted HTTPS message that is appropriately encrypted or otherwise secured by HTTP client 115. This request is received (e.g., on the advertised port) by the TCP server 112 operating as part of local proxy server 111.

Proxy server 111 suitably encapsulates the received message within connectionless UDP-type constructs as described herein (function 206). Various embodiments use the data bits of the received request 204 as payload data for transmitted UDP packets. Typically, the UDP packets formatted by the SUDP client 112 will include enhancements described above for improved reliability. That is, a portion of the typical UDP payload may include augmented "header" data that identifies the data packet, and that allows the receiving device to request re-transmission of any packets that may become lost or delayed during transmission on network 137. In such embodiments, sequencing and ordering of payload data is handled within the secure UDP protocol so that the data can later be extracted and reassembled by server 120. The UDP-type packets that are exchanged in this scenario may therefore appear as conventional UDP packets to routing, gateway and firewall devices such that they can be routed on network 137 as conventional "connectionless" transport layer packets. But enhancements within the UDP payload data can provide additional end-to-end reliability for the underlying data.

Secure UDP packets 208 containing the encapsulated HTTP request 204 are re-transmitted on network 137 as appropriate. Typically, the secure UDP packets 208 are transmitted via connection 135 (FIG. 1) using the IP or other WAN addresses of the client device 102 and server device 120, without regard to the addressing of the underlying HTTP packets 204. Other embodiments could structure the addressing to be fully compliant with network 137 (e.g., by using conventional addressing within message 204), but this is not necessary in all implementations.

Proxy client 141 of server device 120 receives the secure UDP packets 208 via network 137. The received packets are processed (function 210) to extract the underlying HTTPS content, and to recognize any reliability or security issues. If the augmented header data in one or more packets 208 indicates that a packet is missing or delayed, for example, the local proxy client 141 can send a request for retransmission (function 211) to the client device 102. The proxy server 112 executing on the client 102 can then re-transmit any missing data packets, as appropriate.

Data 212 that is extracted from properly-received packets 208 can be re-assembled or otherwise formatted for delivery to the HTTP server 145 as appropriate. In various embodiments, the re-assembled HTTPS/TCP data 212 is forwarded using the proxy address for intra-device communication, as appropriate. As noted above, messages may be temporarily stored in buffer 144 as needed prior to retransmission.

The HTTP server 145 of server device 120 processes the received content 212 as appropriate. In various embodiments, HTTP server 145 manages the security and authentication aspects of the secure HTTP messages 212 (function 214) to perform decryption, to validate digital signatures, and/or to perform other secure HTTP functions as appropriate. If the request 212 is properly authenticated and authorized based upon processing of the secure HTTP features, then additional processing can be performed. If authentication or authorization fails, then the client request will be expressly denied (e.g., by transmitting a denial message or request for re-transmission) or implicitly denied by simply stopping further processing of the request.

If the request 212 is properly authenticated and authorized, however, then server device 120 performs further processing to service the request. In various embodiments, server device 120 obtains requested media content from data storage 150 or the like (function 216), performs any needed encoding or transcoding, and formats the requested content for transmission back to the requesting client device 102 (function 218). Formatting typically includes processing the received media data as a secure HTTP message 220 (including any appropriate encryption or digital rights management) that can be transmitted to the local proxy client 141 using, for example, the dummy address scheme described above. The proxy client 141 suitably encapsulates the received HTTPS messages 220 into secure UDP frames (function 222) using the techniques described herein. The secure UDP packets 224 encapsulating the secure media content can then be delivered to client device 102 via connection 132 over network 137 using the network address of the client device 102.

Client device 102 receives the secure UDP messages and extracts the encapsulated HTTPS content as appropriate (function 226). If the augmented header data in the receive UDP packets 224 indicates one or more missing messages, then the missing data can be requested for re-transmission by the server device 120 as appropriate (function 227). The extracted HTTP data 228 is then forwarded (after being buffered as needed) to the HTTP client 115 using the dummy intra-device addressing described above. HTTP client 115 performs any needed decryption and authorization (function 230) on the received data. If the authorization is in order, the encoded media content can be further processed (function 232) for decoding, packet ordering and assembly, and rendering to the viewer as desired.

By encapsulating secure HTTP/TCP content within secure UDP frames, then, the connectionless "hole punching" capabilities of UDP can be used to improve communication reliability without sacrificing the security of the underlying data. The general concepts described herein could be expanded in any number of ways to address any number of different client or server devices. Although the network environment is often described herein as a "home" environment, for example, equivalent concepts could be applied to offices, schools, factories, restaurants and bars, and/or any number of other environments that make use of multiple local area networks. Moreover, the concepts described herein with respect to contacting DVR or PVR video storage devices to establish video streaming could be equivalently applied for other applications or purposes, such as internet television (IPTV), video gaming, home or office control, file or print sharing and/or any other applications as desired.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. An automated process executed by processor of a client device to securely receive requested content from a server device via a network, the automated process comprising:
    transmitting, via the network, a request message from the client device that identifies the requested content, wherein the request message is formatted in a connectionless user datagram protocol (UDP) format that encapsulates secure data formatted in a connection-based transmission control protocol (TCP) format;
    subsequently receiving the requested content from the server device, wherein the requested content is received in the connectionless UDP format that encapsulates the requested content in the connection-based TCP format;
    extracting the requested content formatted in the connection-based TCP format from the connectionless UDP format;
    authorizing the extracted requested content formatted in the connection-based TCP format; and
    if the authorizing is in order, the client device rendering the requested content for playback.

2. The automated process of claim 1 wherein the requested content received from the server device in the connectionless UDP format comprises augmented header data that identifies UDP messages containing the requested content.

3. The automated process of claim 2 wherein the automated process further comprises determining whether the augmented header data received from the server device indicates one or more missing messages, and, if so, requesting the one or more missing messages for re-transmission by the server device.

4. The automated process of claim 1, wherein the client device forwards the extracted content formatted in the connection-based TCP format from a local proxy client executing on the client device to a TCP server also executing on the client device.

5. The automated process of claim 4 wherein the local proxy client communicates with the TCP server of the client device using a first proxy address that is different from a first network address used by the client device to communicate on the network.

6. The automated process of claim 5 wherein a local proxy server executed by the server device operates with a second proxy address that is compatible with the first proxy address used by the local proxy client of the client device.

7. The automated process of claim 6 wherein the server device communicates with the client device via the network using a second network address that is different from the second proxy address.

8. The automated process of claim 4 wherein the connection-based TCP format comprises a secure hypertext transport protocol (HTTPS) that encrypts the requested content.

9. The automated process of claim 8 further comprising the client device decrypting the requested content if the authorizing is in order.

10. The automated process of claim 1 wherein the connectionless UDP protocol is a secure protocol that comprises header data describing data packets that have been transmitted by the server device but not confirmed to be received by the client device.

11. A client device comprising a processor, a non-transitory data storage and an interface to a network, wherein the non-transitory data storage is configured to store computer-executable instructions that, when executed by the processor, perform an automated process to securely obtain requested content from a server device via the network, the automated process comprising:
    transmitting, via the network, a request message from the client device that identifies the requested content, wherein the request message is formatted in a connectionless user datagram protocol (UDP) format that encapsulates secure data formatted in a connection-based transmission control protocol (TCP) format;
    subsequently receiving the requested content from the server device, wherein the requested content is received in the connectionless UDP format that encapsulates the requested content in the connection-based TCP format;
    extracting the requested content formatted in the connection-based TCP format from the connectionless UDP format;
    authorizing the extracted requested content formatted in the connection-based TCP format; and
    if the authorizing is in order, the client device rendering the requested content for playback.

12. The client device of claim 11, wherein the client device forwards the extracted secure data formatted in the connection-based TCP format from a local proxy client executing on the client device to a TCP server also executing on the client device.

13. The client device of claim 12 wherein the client device forwards the requested content formatted according to the connection-based TCP format from the local proxy client to the TCP server.

14. The client device of claim 13 wherein the local proxy client extracts data packets formatted according to the connection-based TCP format from the connectionless UDP protocol.

15. The client device of claim 14 wherein the local proxy client communicates with the TCP server using a first proxy address that is different from a first network address used by the client device to communicate on the network.

16. The client device of claim 15 wherein a second local proxy server executed by the server device operates with a second proxy address that is compatible with the first proxy address.

17. The client device of claim 16 wherein the server device communicates with the client device via the network using a second network address that is different from the second proxy address.

18. The client device of claim 11 wherein the connectionless UDP protocol comprises augmented header data describing missing data packets that have been transmitted by the server device but not yet confirmed to be received by the client device, and wherein the automated process further comprises determining whether the augmented header data indicates one or more missing data packets, and, if so, requesting the one or more missing data packets for retransmission by the server device.

19. The client device of claim 11 wherein the connection-based TCP format comprises a secure hypertext transport protocol (HTTPS) that encrypts the requested content.

20. The client device of claim 19 wherein the client device is further configured to decrypt the requested content if the authorizing is in order.

* * * * *